United States Patent
Butler et al.

(10) Patent No.: US 8,832,072 B2
(45) Date of Patent: Sep. 9, 2014

(54) CLIENT AND METHOD FOR DATABASE

(75) Inventors: Mark Henry Butler, Bristol (GB); David Murray Banks, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 2358 days.

(21) Appl. No.: 11/440,118

(22) Filed: May 25, 2006

(65) Prior Publication Data

US 2007/0276847 A1 Nov. 29, 2007

(30) Foreign Application Priority Data

May 26, 2005 (GB) .................................. 0510727.1

(51) Int. Cl.
*G06F 7/00* (2006.01)
*G06F 17/30* (2006.01)

(52) U.S. Cl.
CPC ................................ *G06F 17/30448* (2013.01)
USPC ............................ 707/713; 707/705; 707/718

(58) Field of Classification Search
USPC .................. 707/2, 3, 4, 6, 100, 705, 713, 718
See application file for complete search history.

(56) References Cited

U.S. PATENT DOCUMENTS

| | | | | |
|---|---|---|---|---|
| 5,355,474 A | * | 10/1994 | Thuraisngham et al. | 707/9 |
| 5,701,454 A | * | 12/1997 | Bhargava et al. | 707/2 |
| 5,819,257 A | * | 10/1998 | Monge et al. | 707/2 |
| 6,192,371 B1 | * | 2/2001 | Schultz | 707/103 R |
| 6,493,708 B1 | * | 12/2002 | Ziauddin et al. | 707/3 |
| 2003/0074352 A1 | * | 4/2003 | Raboczi et al. | 707/4 |
| 2003/0163466 A1 | * | 8/2003 | Rajaraman et al. | 707/6 |
| 2004/0254928 A1 | * | 12/2004 | Vronay et al. | 707/5 |
| 2006/0161544 A1 | * | 7/2006 | Lee et al. | 707/6 |
| 2006/0235837 A1 | * | 10/2006 | Chong et al. | 707/4 |

\* cited by examiner

*Primary Examiner* — Apu Mofiz
*Assistant Examiner* — Jared Bibbee

(57) ABSTRACT

A client accepts 20 an input query, rewrites 22 the query and forwards 24 the query to a database server, which returns 26 results which are then rewritten 28. The database includes classes arranged hierarchically as superclasses and subclasses, and/or properties also arranged hierarchically as superproperties and subproperties. In embodiments, the query is rewritten 22 to replace each instance of each class and each property in the input query with the transitive closure of the respective class or property. The client allows inferencing whether or not this is supported by the database server.

21 Claims, 3 Drawing Sheets

CLIENT AND METHOD FOR DATABASE

FIELD OF INVENTION

The invention relates to a client for a database, especially client for a data repository, a method using the client and a computer program product.

RELATED ART

Most popular representations of data represent data using relations, for example binary relations, ternary relations, or more generally n-ary relations, n representing a positive integer at least 2. A relational database uses n-ary relations where each row in a table has n properties. RDF uses binary relations in which objects are related to other objects via a property.

A particular representation of data uses the concept of a property which describes an attribute of a real world object. Thus, objects may be related to properties which describe some attribute of the object—the property may be a pointer to another object representing some form of link between the objects, or the property may represent a particular attribute of the object.

A number of methods may be used to simplify the task of writing algorithms processing data about the real world, and in particular to process data represented as properties.

One way of simplifying algorithms is to have a way of expressing abstractions about properties, i.e. to deal with the case that a number of properties can be treated in the same way. A lattice can be used to define relations between properties, some of which may be abstract, by defining which properties are subproperties of other properties.

A "type" property may be used to split the objects in a store into subsets, so that members of a subset can all be treated in the same way. The term "class" may be used to refer to these subsets since they represent classes of object in the real world. For example, a class called "vehicle" may have a subclass called "car". A class lattice may be used to define this and other relationships.

A minimal description may be expanded and further properties deduced using a technique known as "inference". For example, an object in the database may have a type "car" so it possesses an attribute of type "car" and via inference it also possesses an attribute of type "vehicle" which is a superclass of "car". These inferences may annotate the dataset. The process may be carried out by an "inference engine" which adds the inferred properties to the dataset.

When the data is not static, and data may be modified or removed from the database, the inference engine must update statements inferred from the data. It is desirable to be able to do this without reprocessing the whole data store. For example, the "Jena" framework (further details of which are presently available on-line at http://www.hpl.hp.com/semweb/jena.htm) includes a general purpose rule based reasoner that supports forward chaining, backward chaining and hybrid execution. For forward chaining, it can use the RETE algorithm for allow efficient updating of inferences.

Another approach comes from the field of deductive databases and in particular the use of Prolog or Prolog-type datalog languages with databases, both relational and object databases. Prolog based approaches can be very inefficient, since Prolog in effect tries to resolve everything to a search. In a Prolog program, the programmer can use programming tricks to make the search efficient, but these cannot be used in deductive databases so the queries can be very inefficient.

Another approach is known as "Description Logics", which are a particular approach to data representation with a constrained data model that allows the logic to operate very efficiently. However, modelling can be somewhat complicated.

SUMMARY OF INVENTION

According to the invention there is provided a method of operating a client wherein at least one of relations between properties and relations between classes are defined, relations between properties being defined as directed links linking pairs of properties as superproperty and subproperty, the subproperty inheriting from the superproperty and from any properties from which the superproperty inherits, relations between classes being defined as directed links between pairs of classes, each pair including a superclass and a subclass, the subclass inheriting from the superclass and from any classes from which the superclass inherits, the method including:

accepting an input query including at least one reference to a property;

rewriting the input query as a rewritten query by including together with a reference to a property that is a superproperty, a reference to one or more properties which inherit from the superproperty and/or including together with a reference to a class that is a superclass a reference to one or more classes which inherit from the superclass, sending the rewritten query to the database server; and receiving the results from the server.

The method may be considered as implementing inferencing at the client side to allow inferencing with existing or new systems that do not necessarily include inferencing in the database server. Such systems include conventional databases including relational databases or data repositories. The method links "superproperties" with "subproperties".

The prior art Prolog/Deductive database and description logic approaches are more complex than that applied here, and it would be very difficult if not impossible to implement these on the client side.

The inventor has realised that a simpler inferencing system can be implemented on the client side, and that this simpler system supports the most important functionality of prior art inferencing approaches, at least for some applications.

By allowing inferred properties and/or classes to be dealt with when the query is prepared, inferences need not be added to the data in the database, so it is not necessary to recalculate inferences when new data is added to the database.

In embodiments, only relations between classes are defined and so only references to classes are rewritten. In other embodiments, only relations between properties are defined and so only references to properties are rewritten.

In other embodiments, references to both properties and classes are defined and so both references to properties and to classes are rewritten.

The invention also relates to computer program product and a client implementing the method, together with a method of operating the complete system.

BRIEF DESCRIPTION OF DRAWINGS

Embodiments of the invention will now be described, purely by way of example, with reference to the accompanying drawings, in which.

DETAILED DESCRIPTION

Consider first an example of a database including data classified into classes using a hierarchical structure. An example of such a database might be the Library of Congress' Thesaurus of Graphic Materials or the Getty Art and Architecture Thesaurus.

Consider the example of a specific item stored in the database, in the example a battlefield map. A data item 16 in the database relates to the map; the data item is labelled "Map0718". The map Map0718 is stored with a property labelled "graphic", the property pointing to a graphic representation of the map. The map may be a map of a battle in Poland, stored in a "Battlefield Maps" class which is in a hierarchy of classes:

```
Object
    Visual and Verbal Communication
        Information Form
            Document Genre
                Graphic Document
                    Cartographic Material
                        Maps
                            Military Maps
                                Battlefield Maps
```

Thus, the class of data objects "Battlefield Maps" is a subclass of "Military Maps"—equivalently, "Military Maps" is a superclass of "Battlefield Maps". Similarly, "Military Maps" is itself a subclass of "Maps", which is in turn a subclass of "Cartographic Material".

Figure 1:
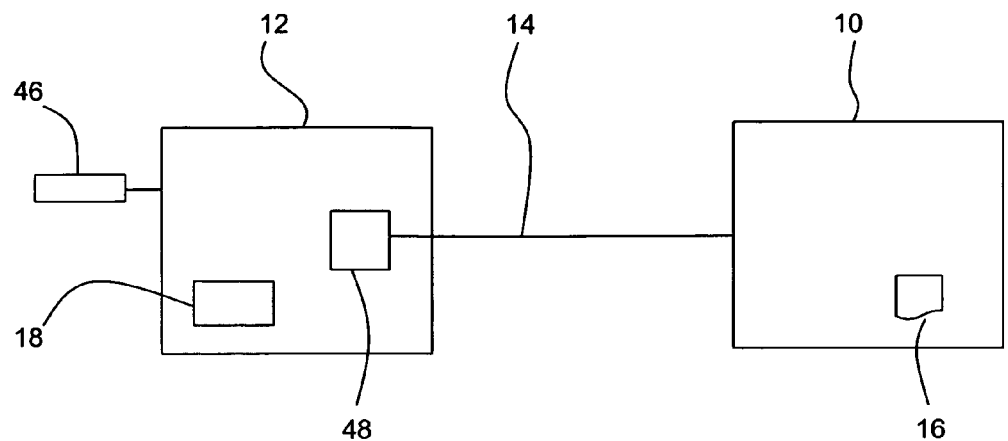
FIG. 1 shows a schematic of a database system according to an embodiment of the invention.

The data, including data about the particular battlefield map 16 (FIG. 1), is stored in a database server 10. A user accesses the data using a client 12 which has an input means 46, for example a computer keyboard. The client 12 has an interface 48 connecting the client to network 14 which in turn is connected to the database server 10. As will be appreciated by the skilled person, the database servers and client may be single conventional computers, but it is envisaged to use any suitable database server and client including multi-processor and/or networked computers. The client and database server both include code which allows them to execute steps of a method.

In order to retrieve data, the user enters an input query (step 20) at client 12. For example, the user may enter a search query for a data item in the class "Cartographic Material" and a property "location" of "Poland".

In an inference system not according to the embodiment, this query might be passed to server 10 and resolved there. The database would find the data item 16 in response to the query as the database would be marked to show that item 16 was deemed to␣be␣an instance of the "Cartographic Material" class by virtue of the inference from its membership of the "Battlefield Map" class.

In the embodiment, however, the input query is rewritten at the client as an amended query (step 22), in which all references to classes which are superclasses are replaced by a reference to the superclass and all subclasses which inherit from the superclass.

Thus, in the example, the input query to search for items in the classes "Cartographic Material" and "Poland" may be input in the form SELECT graphic WHERE type="Cartographic Material" AND location="Poland".

This is rewritten:
SELECT graphic WHERE {type="Cartographic Material" or "Maps" or "Military Maps" or "Battlefield Maps" AND location="Poland"}.

This rewritten query is then sent (step 24) to the database server 10 and processed there, and any results returned (step 26) to the client. The results will be the selected graphic images of maps retrieved.

By carrying out these steps, the database may be queried in a fashion that includes inferencing without requiring the use of a database server incorporating inferencing. This allows the use of conventional databases, and greatly simplifies updating the database since there is no need to make changes in the inferencing when data is updated, since the inferencing happens when the query is parsed in the client, in the example in real time.

The skilled person will appreciate that in large databases with data divided into a large number of different classes the number of subclasses in the rewritten query may be much larger than this. However, this small increase in network traffic is only a minor consideration compared with the benefit of not requiring inferencing in database server 10.

The way in which the system according to this embodiment deals with superproperties and subproperties is a little more complicated. The reason for this is that inference may be needed on the results of the query to rewrite the properties of a returned data object.

By way of example, the database may include properties providing indications about people or organisations with certain rights relating to the images contained in the database. For example, there may be an "owner" property indicating the owner of the item depicted in the database (in the example, a battlefield map). There may be a "donor" property indicating who donated the item, a "creator" property indicating the artist, and others.

These properties may all be subproperties of a "rights" property, linking an object in the database to an individual or organisation with some rights (in a broad sense) in the object.

Thus, consider that in the example the battlefield map of Poland is owned by the British Library and was donated by "Smith".

A user seeking to search for this item may enter (step 20) an input query at client 12 for data items with a "rights" property of "Smith" and a location property of "Poland":
{SELECT rights WHERE rights="Smith" and location="Poland"}

This query is resolved in the embodiment by rewriting (step 22) the input query as a rewritten query. In general terms, the rewritten query replaces any reference to a property that is a superproperty in the input query to reference the superproperty and all properties from which the superproperty inherits.

In the specific example, the superproperty "rights" is replaced by the superproperty itself "rights" together with all subproperties, as:
{SELECT rights WHERE {rights="Smith" or donor="Smith" or creator="Smith" or owner="Smith"} and {location="Poland"}}

This rewritten query is passed to the server (step 24) and query results returned (step 26).

The embodiment carries out a further processing step (step 28) on the returned data to ensure that the results correctly use the information on the structure of properties, which information is not available to server 10. Thus, where the query provides a value of a property that is a subproperty, the further processing step adds reference to the value being the value of properties that are superproperties of the subproperty. In the embodiment, the processing adds references to all properties from which the subproperty inherits, though this is not essential and in alternative embodiments only some references need be added.

For example, consider that the query finds a single data item and returns a single data item ("Map0718") with the following rights data:

| owner | British Library |
|---|---|
| donor | Smith |

In this example, the creator is unknown.

The data item is processed (step 28) and returned to the user including the additional property "rights" including the following data which is obtained using the information that "rights" is a superproperty of "owner" and of "donor":

| rights | British Library, Smith. |
|---|---|

In the embodiment, the user may wish to query data on multiple levels at once. For example, the user may be seeking items available in the British Library having some relationship to Smith. In this case, for example the user may enter an input query:
SELECT rights WHERE owner="British Library" and rights="Smith"
This is rewritten as
{SELECT rights WHERE {rights="Smith" or donor="Smith" or creator="Smith" or owner="Smith"}} and {owner="British Library"}}
This will return the same rights data as above:

| owner | British Library |
|---|---|
| donor | Smith |

As before, the returned data item is processed in the client (step 28) to include also the additional property rights and data items:

| rights | Smith, British Library |
|---|---|

The functionality provided by the embodiment may be used to implement a search engine for very large databases with a very complex set of properties and classes. The user can search the database using a limited set of classes and properties without needing to understand the complex relationships between all the different classes and all the different properties. The invention is not only of use in very large databases and may be used with databases of any size.

The client may then process the processed data items as required. For example, the client may display the results of a query, including the data items and some or all of the properties. For example, the data item Map0718 may be displayed as a graphic of the map together with a list of the rights owners and a label of the map.

In this embodiment, the client applies inferencing to both classes and properties. Examples will be presented later where this is not the case.

It should be noted that it is not necessarily the case that a query will return the complete data item with all its properties. In particular, some queries may just return the identify of the found data item without attached properties. In this case, since the returned data item includes no properties, the additional processing of the properties (step 28) can be omitted.

Figure 3:
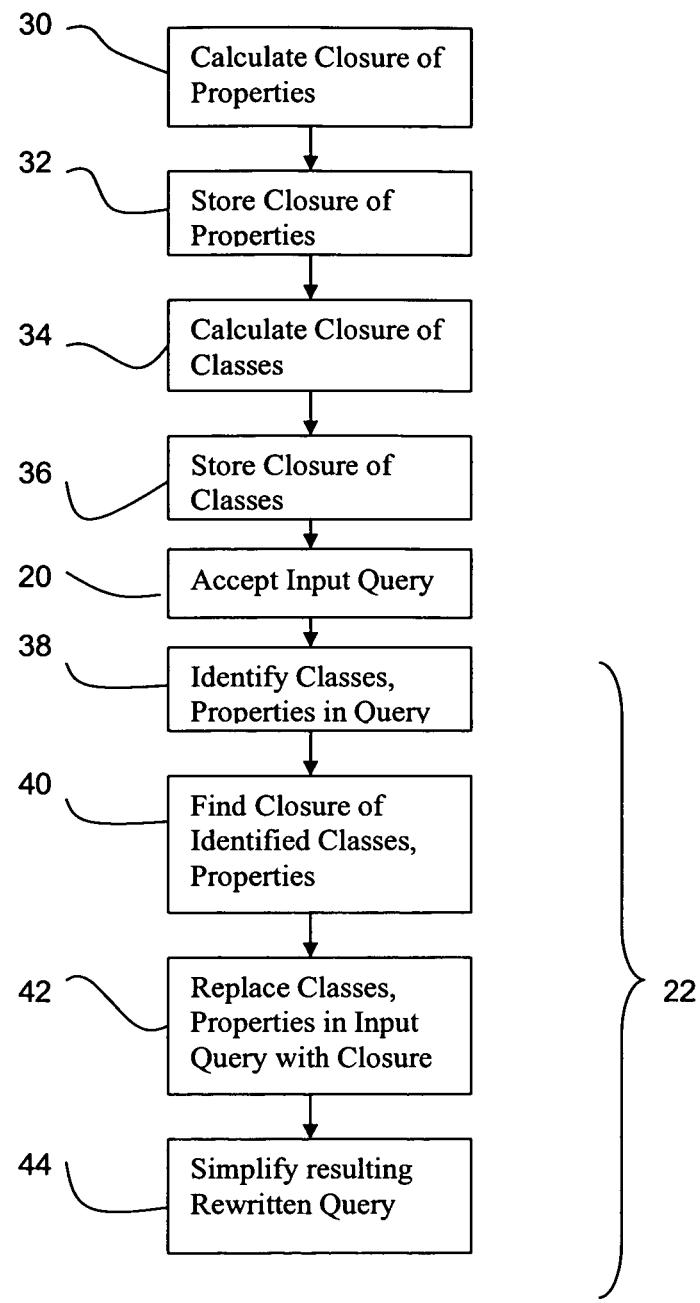
FIG. 3 shows a detail flow diagram of a method according to an embodiment of the invention.

The processing used in the embodiment to rewrite input queries will now be described in more detail with reference to FIG. 3.

Firstly, the client side 12 calculates (step 30) the transitive closure of all properties, taking the set of properties as a directed graph, each vertex of the graph representing the property and the edges of the graph linking a pair of properties, one of the pair being the superproperty of the other of the pair being a subproperty.

Mathematically, the transitive closure is a graph defined for a directed graph having vertices v and edges e. The transitive closure is a new graph having an edge from a vertex v1 to another vertex v2 if and only if there is a path in the directed graph from vertex v1 to vertex v2.

Figure 4:
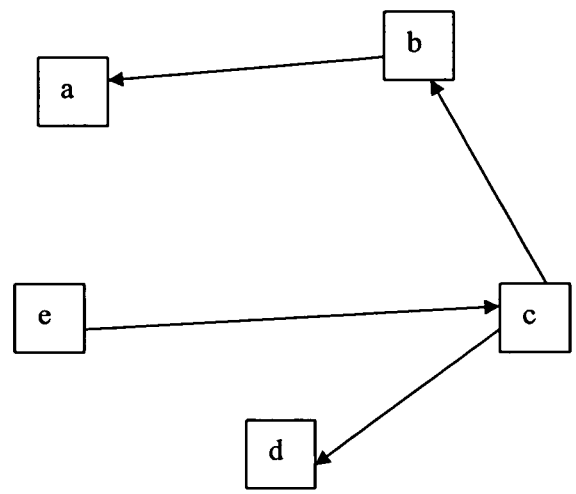
FIG. 4 illustrates a directed graph of properties.

For example, given the relationships:
a is a subproperty of b
b is a subproperty of c
d is a subproperty of c
c is a subproperty of e,
the directed graph is that of FIG. 4.

The transitive closure is the graph of subproperties:
e has subproperties a, b, c and d
c has subproperties a, b and d
b has subproperty a; and
a and d have no subproperties.

Figure 5:
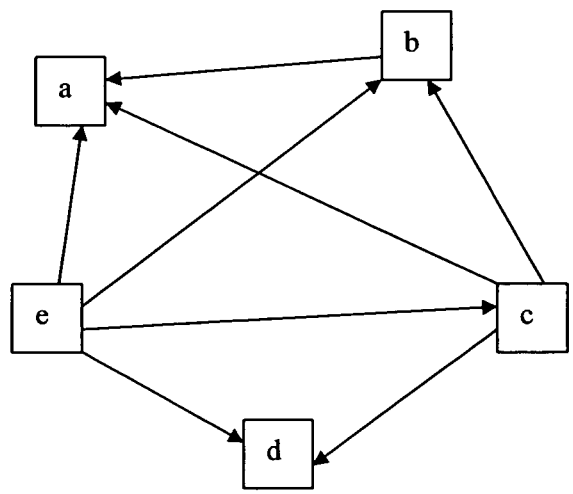
FIG. 5 illustrates the transitive closure of the graph of FIG. 4.

This graph is shown in FIG. 5.

The properties which "inherit from" a specific property (which will be a superproperty) refers to the subproperties of the specific property together with properties that are sub-properties of the sub-properties, sub-properties of those sub-properties, etc, that is to say sub-properties of the specific property or any properties which inherit from the specific property.

Next, this data is stored (step 32) as a hash map of lists which can deliver from an input key of a property the complete list of subproperties (if any) downstream of that property.

A similar approach is taken with classes. The closure of all classes is calculated (step 34) and then stored as a hash map of lists (step 36).

Although these tasks are carried out on the client 12 in the embodiment it is also possible to carry out the processing to calculate the transitive closure and the hash maps of lists elsewhere, for example at the server 10, and then to transmit the list data to the client 12.

An input query that is input at the client in step 20 is then rewritten by first (step 38) identifying each property and class in the input query, querying (step 40) the respective hash map of lists to obtain the complete list of sub properties and sub-classes respectively, and replacing (Step 42) each property and class in the input query with the respective list of sub-properties and subclasses. In this way, the substitution can be readily carried out with minimal delay at run time in this embodiment.

Next, step 44, the query is simplified by replacing multiple references to the same property so that each property is only queried once.

Thus, in the event that the query resulting from step 40 includes both owner="Smith" or owner="Jones", these two elements of the query may be combined. The skilled person will appreciate that for some complex queries it may not be possible to combine the query without changing the query, and in these cases the query is not combined.

Figure 2:
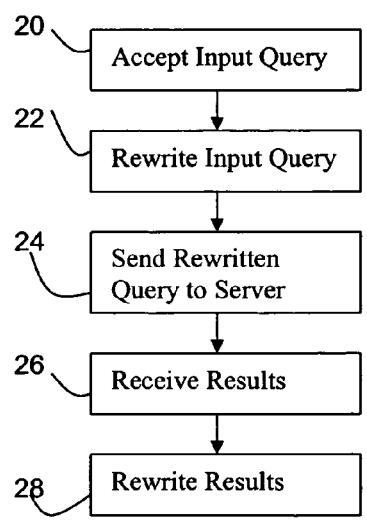
FIG. 2 shows a flow diagram of a method according to an embodiment of the invention.

The skilled person will appreciate that steps 38 to 44 combined correspond to step 22 described with reference to FIG. 2.

Note that in alternative embodiments the preparation of the hash maps may be done in real time as the query is run, each time client software is started, or the hash maps may be stored permanently and only updated when the hierarchical class or property structure is changed.

The methods described above with reference to FIGS. 2 and 3 are carried out by code in the client 12 together with code in the database server 10. In the described embodiment, the code in the database server 10 is known and implements a conventional database without inference—the code 12 in the client allows this database to be accessed by a user to use inference even though this functionality is not provided in the database server. However, the invention is also applicable to non-standard database servers 10 and in this case some of the functionality, for example to prepare the hash maps of lists, may be carried out there.

The invention is not just useful in the above applications. For example, consider the case that a company is implementing an internet auction site. In order to help find items, the items are organised into hierarchical categories. The top level category is "Buy" and this can contain sub-categories such as "Music", "Musical Instruments", "Cars", "Books" and "Clothes". These are again sub-divided, for example the "Musical Instrument" category can include "Brass", "Synthesizer", "Guitar", "Drums", "Percussion". These categories can be still further divided, for example the "Guitar" category can be divided into "Acoustic" and "Electrical", "Acoustic" in turn can be further divided as "Classical" and "Electro-Acoustic".

In order to ensure that an item for sale categorised as "Classical" is also picked up in any search for a "guitar", inference by classes can be provided as set out above. Note in this case that this embodiment is still useful even though the class structure is defined centrally—the class structure may be downloaded from the server to clients of the Auction site.

Note that in this example only inheritance of classes is used, not properties.

Another example is a database created by combining data from two different enterprise content management systems, using different property labels. For example, one system the title of a document may be described by a property "Main Title", and the creator indicated by a property "Creator". In the other system, the title may be indicated by a property "Title" and the creator by a field "Author". Searching across the combined data is therefore difficult.

An embodiment provides a simple solution without needing to reprocess all the data with the combined data which might render that data unusable with existing systems. A schema can be created that defines both "Title" and "Main Title" as subproperties of "dc:title" (where dc stands for the metadata standard "Dublin Core"). Similarly, both "Author" and "Creator" can be defined as subproperties of "dc:creator". A search can then search the superproperties "dc:title" and "dc:creator" and hide the different data sources and their respective labels by inference.

In this case, only inheritance of properties is used, not classes.

Although the invention has been described above for relatively simple embodiments the invention may be applied to very large and complex databases having a vast amount of data and relationships between data.

In the above embodiments, rewriting the input query replaces references to a superproperty or superclass with references to all properties or classes inheriting from that superproperty or superclass. However, in other embodiments, it may be possible to limit the number of rewritten references.

The skilled person will appreciate that the detail of the embodiments can be varied. For example, the transitive closure of the properties may be stored other than as a hash map; in other embodiments, the definitions of which properties are subproperties of which other properties and/or which classes are subclasses of which other classes may be stored in some other format not requiring the transitive closure to be calculated.

The invention claimed is:

1. A method of operating a client for a database system, the database system having a server which stores data in the form of data items and properties of the data items, wherein the data items are grouped into classes, wherein at least one of relations between properties and relations between classes are defined, relations between properties being defined as directed links linking pairs of properties as superproperty and subproperty, the subproperty inheriting from the superproperty and from any properties from which the superproperty inherits, relations between classes being defined as directed links between pairs of classes, each pair including a superclass and a subclass, the subclass inheriting from the superclass and from any classes from which the superclass inherits, the method comprising:
   accepting an input query including at least one reference to a property or at least one reference to a class;
   rewriting at the client the input query as a rewritten query by including together with a reference to a property that is a superproperty a reference to one or more properties which inherit from the superproperty and/or including together with a reference to a class that is a superclass a reference to one or more classes which inherit from the superclass;
   sending the rewritten query from the client to the database server; and
   receiving results from the server.

2. A method according to claim 1 further comprising, when the results from the server include a reference to a subproperty, rewriting the results to add together with a reference to the subproperty references to at least one property from which the subproperty inherits.

3. A method according to claim 1 wherein only relations between properties are defined and the step of rewriting the input query only rewrites references to properties.

4. A method according to claim 1 wherein only relations between classes are defined and the step of rewriting the input query only rewrites references to classes.

5. A method according to claim 1 wherein both relations between properties and classes are defined and the step of rewriting the input query rewrites references to both properties and classes.

6. A method according to claim 1, the method further comprising the steps of:
   calculating a transitive closure of a directed graph of classes and storing the transitive closure as one or more lists, and
   using at least one of the one or more lists to rewrite the input query containing a reference to a class that is a superclass.

7. A method according to claim 6 comprising storing the transitive closure as a hash map of lists.

8. A method according to claim 1, the method further comprising the steps of:
   calculating a transitive closure of a directed graph of all properties and storing the transitive closure as one or more lists, and using at least one of the one or more lists to rewrite the input query referencing a property.

9. A method according to claim 8 comprising storing the transitive closure as a hash map of lists.

10. A computer program product which is arranged, when installed in a client, to cause the client to execute a method according to claim 1.

11. A client for a database system having a database server and a client, the database server storing data in the form of data items and properties of the data items, wherein at least one of relations between properties and relations between classes are defined, relations between properties being defined as directed links linking pairs of properties as superproperty and subproperty, the subproperty inheriting from the superproperty and from any properties from which the superproperty inherits, relations between classes being defined as directed links between pairs of classes, each pair including a superclass and a subclass, the subclass inheriting from the superclass and from any classes from which the superclass inherits, the client comprising:
  an input for accepting an input query including at least one reference to a property and at least one reference to a class;
  code arranged to rewrite at the client the input query as a rewritten query by including together with a reference to a property that is a superproperty a reference to one or more properties which inherit from the superproperty and including together with a reference to a class that is a superclass a reference to one or more classes which inherit from the superclass;
  a network connection for connecting to the database server to send the rewritten query from the client to the database server and to receive results from the database server in response to the rewritten query;
  code arranged to rewrite the results by combining results generated from subproperties into the single superproperty; and
  a processor to implement the code arranged to rewrite the input query and the code arranged to rewrite the results.

12. A client according to claim 11 wherein the code arranged to rewrite the results from the server is arranged, when the results from the server include a reference to a subproperty, to rewrite the results from the server to add together with a reference to the subproperty references to at least one property that is upstream of the subproperty.

13. A client according to claim 11 wherein relations between classes are defined, the client further comprising a data store storing a transitive closure of a directed graph of classes.

14. A client according to claim 11 wherein relations between properties are defined, the client further comprising a data store storing a transitive closure of a directed graph of properties.

15. A database system comprising:
  a client according to claim 11;
  a database server storing data in the form of data items and properties of the data items; and
  a database processor to implement the database server.

16. A method of operating a client for a database system having a server which stores data in the form of data items and properties of the data items, wherein at least one of relations between properties and relations between classes are defined, relations between properties being defined as directed links linking pairs of properties as superproperty and subproperty, the subproperty inheriting from the superproperty and from any properties from which the superproperty inherits, relations between classes being defined as directed links between pairs of classes, each pair including a superclass and a subclass, the subclass inheriting from the superclass and from any classes from which the superclass inherits, the method comprising:
  accepting an input query including at least one reference to a property and at least one reference to a class;
  rewriting at the client the input query as a rewritten query by including together with a reference to a property that is a superproperty a reference to one or more properties which inherit from the superproperty and including together with a reference to a class that is a superclass a reference to one or more classes which inherit from the superclass;
  sending the rewritten query from the client to the database server; and
  receiving results from the server.

17. A method according to claim 16 further comprising, when the results from the server include a reference to a subproperty, rewriting the results from the server to add together with a reference to the subproperty references to at least one property from which the subproperty inherits.

18. A method of operating a client for a database system, the database system having a server which stores data in the form of data items and properties of the data items, wherein relations between properties are defined as directed links linking pairs of properties as superproperty and subproperty, the subproperty inheriting from the superproperty and from any properties from which the superproperty inherits, the method comprising:
  accepting an input query including at least one reference to a property;
  rewriting at the client the input query as a rewritten query by including together with a reference to a property that is a superproperty a reference to one or more properties which inherit from the superproperty;
  sending the rewritten query from the client to the database server; and
  receiving results from the server.

19. A method of operating a client for a database system, the database system having a server which stores data in the form of data items, wherein the data items are grouped into classes, wherein relations between classes are defined as directed links between pairs of classes, each pair including a superclass and a subclass, the subclass inheriting from the superclass and from any classes from which the superclass inherits, the method comprising:
  accepting an input query including at least one reference to a class;
  rewriting at the client the input query as a rewritten query by including together with a reference to a class that is a superclass a reference to one or more classes which inherit from the superclass;
  sending the rewritten query from the client to the database server; and
  receiving results from the server.

20. A method of operating a client for a database which stores data in the form of (i) data items grouped into classes which pair with each other as sub and super class when the subclass is a specific instance of the superclass, thereby inheriting from the superclass and any classes from which that superclass inherits; and (ii) properties of the data items which pair with each other as sub and super property when the subproperty is a specific instance of the superproperty, thereby inheriting from the superproperty and from any properties from which that superproperty inherits, the method comprising:

accepting an input query which references a property and a class;

rewriting at the client the input query by one or more of:
including together with a reference to a superproperty a reference to one or more properties which inherit from the superproperty; and
including together with a reference to a class that is a superclass a reference to one or more classes which inherit from the superclass, sending the rewritten query from the client to the database server.

21. A non-transitory computer readable storage medium at a client comprising: at least one sequence of instructions which, when executed by a computer, cause the computer to:

accept an input query including at least one reference to a property and at least one reference to a class;

rewrite the input query as a rewritten query by including together with a reference to a property that is a superproperty a reference to one or more properties which inherit from the superproperty and including together with a reference to a class that is a superclass a reference to one or more classes which inherit from the superclass, wherein at least one of relations between properties and relations between classes are defined, relations between properties being defined as directed links linking pairs of properties as superproperty and subproperty, the subproperty inheriting from the superproperty and from any properties from which the superproperty inherits, relations between classes being defined as directed links between pairs of classes, each pair including a superclass and a subclass, the subclass inheriting from the superclass and from any classes from which the superclass inherits;

send the rewritten query from the client to a database server comprising a server which stores data in the form of data items and properties of the data items, wherein the data items are grouped into classes; and receive results from the server.

* * * * *